US008396468B1

(12) United States Patent
Krinsky et al.

(10) Patent No.: US 8,396,468 B1
(45) Date of Patent: Mar. 12, 2013

(54) ASSESSING PERFORMANCE AND QUALITY OF A MOBILE COMMUNICATION SERVICE

(75) Inventors: Jeffrey A. Krinsky, Woodinville, WA (US); Falguni Sarkar, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1311 days.

(21) Appl. No.: 11/227,972

(22) Filed: Sep. 15, 2005

(51) Int. Cl.
*H04W 24/00* (2009.01)

(52) U.S. Cl. ............... 455/423; 455/421; 455/67.11; 455/422.1; 455/424; 455/425

(58) Field of Classification Search ......... 379/1, 265.07; 707/3; 455/24, 414.1–432.2, 67.11
See application file for complete search history.

(56) References Cited

U.S. PATENT DOCUMENTS

| | | | |
|---|---|---|---|
| 5,446,492 A | 8/1995 | Wolf et al. | 348/192 |
| 5,734,422 A | 3/1998 | Maurer et al. | 348/184 |
| 5,940,471 A * | 8/1999 | Homayoun | 379/10.03 |
| 6,055,015 A | 4/2000 | Edwards | 348/192 |
| 6,246,435 B1 | 6/2001 | Patel | 348/192 |
| 6,259,477 B1 | 7/2001 | Hu | 348/180 |
| 6,463,265 B1 | 10/2002 | Cohen et al. | |
| 6,496,221 B1 | 12/2002 | Wolf et al. | 348/192 |
| 6,522,888 B1 | 2/2003 | Garceran et al. | |
| 6,678,424 B1 | 1/2004 | Ferguson | 382/286 |
| 7,133,498 B2 | 11/2006 | Cacioppo et al. | |
| 7,450,694 B2 | 11/2008 | Cacioppo et al. | |
| 2001/0016488 A1 | 8/2001 | Haymes et al. | |
| 2003/0040272 A1 | 2/2003 | Lelievre et al. | |
| 2003/0041056 A1 * | 2/2003 | Bossemeyer et al. | 707/3 |
| 2004/0172323 A1 * | 9/2004 | Stamm | 705/10 |
| 2004/0176040 A1 | 9/2004 | Thornton et al. | |
| 2005/0272437 A1 | 12/2005 | Ritter et al. | |
| 2006/0002540 A1 * | 1/2006 | Kreiner et al. | 379/265.02 |
| 2006/0046749 A1 | 3/2006 | Pomerantz et al. | |
| 2006/0073786 A1 * | 4/2006 | Sarkar | 455/24 |
| 2006/0087409 A1 | 4/2006 | Korzeniowski | |
| 2006/0199548 A1 | 9/2006 | Saraby | |
| 2006/0203738 A1 * | 9/2006 | Fok et al. | 370/252 |
| 2006/0227944 A1 * | 10/2006 | Paden et al. | 379/70 |
| 2006/0262793 A1 | 11/2006 | Vare et al. | |
| 2007/0283400 A1 | 12/2007 | Lee et al. | |
| 2008/0085096 A1 | 4/2008 | Marshall | |
| 2008/0248743 A1 | 10/2008 | Krinsky | |
| 2009/0111462 A1 | 4/2009 | Krinsky | |

OTHER PUBLICATIONS

U.S. Appl. No. 11/227,972, filed Sep. 15, 2005, Krinsky.
Hall, T.A., "Objective speech quality measures for internet telephone," National Institute of Standards and Technology, year not available, 9 pages.
U.S. Appl. No. 11/624,567, filed Jan. 18, 2007, Krinsky.

* cited by examiner

*Primary Examiner* — Justin Lee
(74) *Attorney, Agent, or Firm* — Woodcock Washburn LLP

(57) ABSTRACT

A call quality monitoring system allows a user of a mobile device to report on call quality or otherwise provide information relating to the quality of a wireless communication experience. The call quality monitoring system may allow the mobile device user to establish or accept a call placed on the wireless communication network. The call quality monitoring system may provide at least partially-automated user-feedback process for the user to specify information about the quality of the call from a device from which the call was placed or from a device located at or near a location of the call. The call quality monitoring system may collect information provided by the user in association with specifying information about the quality of the call.

26 Claims, 11 Drawing Sheets

ASSESSING PERFORMANCE AND QUALITY OF A MOBILE COMMUNICATION SERVICE

BACKGROUND

Maintaining quality of service in the eyes of customers is an important factor in services industries. This is especially the case in the wireless/mobile communications industry, where customers often base their decisions to join, or stay with a particular wireless service provider based on the quality of the services provided. For example, with respect to wireless telephones, events such as recurring dropped calls, poor sound quality during calls, and unexpected unavailability of service may drive customers to seek a new service provider, especially given rising standards for call quality.

Currently, various techniques exist for monitoring quality of service in the wireless communications industry. Some of these techniques, such as PESQ (Perceptual Evaluation of Speech Quality) obtain objective quality of service information. For example, PESQ measures voice quality by comparing an input test signal with the signal output across a connection. Another objective technique, ITU-T E-model (e.g., ITU-T G.107) predicts conversational MOS (mean opinion score) from IP networks and/or terminal parameters. Subjective techniques also exist where test mobile devices are established to monitor sound quality. Service providers often arrange for such testing immediately following network upgrades, etc.

The techniques described above are often difficult to implement, may be limited in their capability to monitor an entire network, and may be expensive, especially in the case of call quality monitoring techniques that utilize specialized infrastructure. Many of these techniques may also cause unwanted load on the network. In addition, it is often not practical to implement such techniques on a regular basis. In addition, current quality monitoring techniques are difficult to implement throughout the entire network, especially when networks may span such a large and diverse geographical area. For example, current quality monitoring techniques may be implemented so that a single cell is used to report on the quality of an entire region. Accordingly, it may be difficult to accurately monitor all areas of the network using such techniques.

Figure 1:
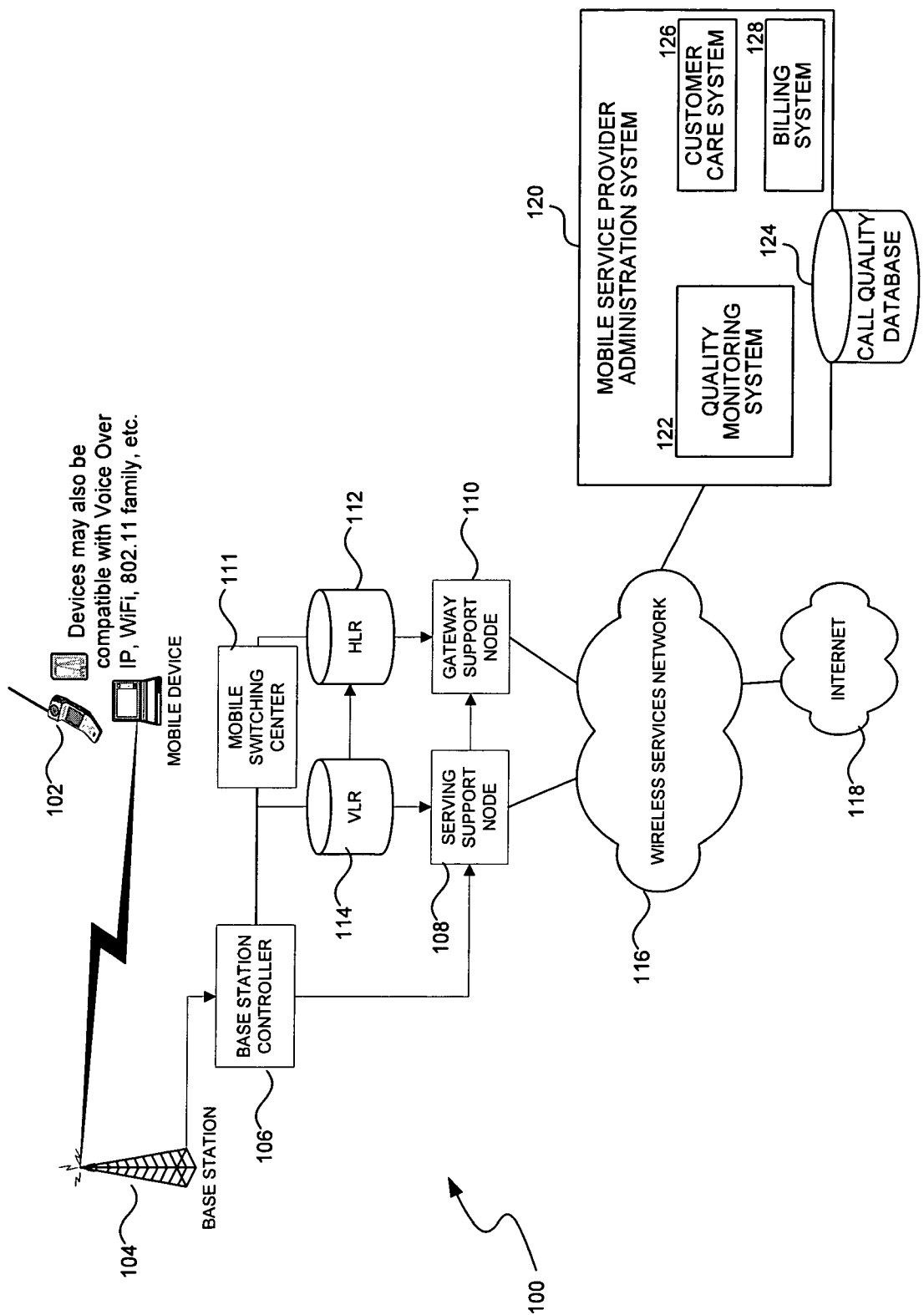
FIG. 1 is a block diagram showing an example of an environment in which the invention may be implemented in one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Representative System

Figure 2:
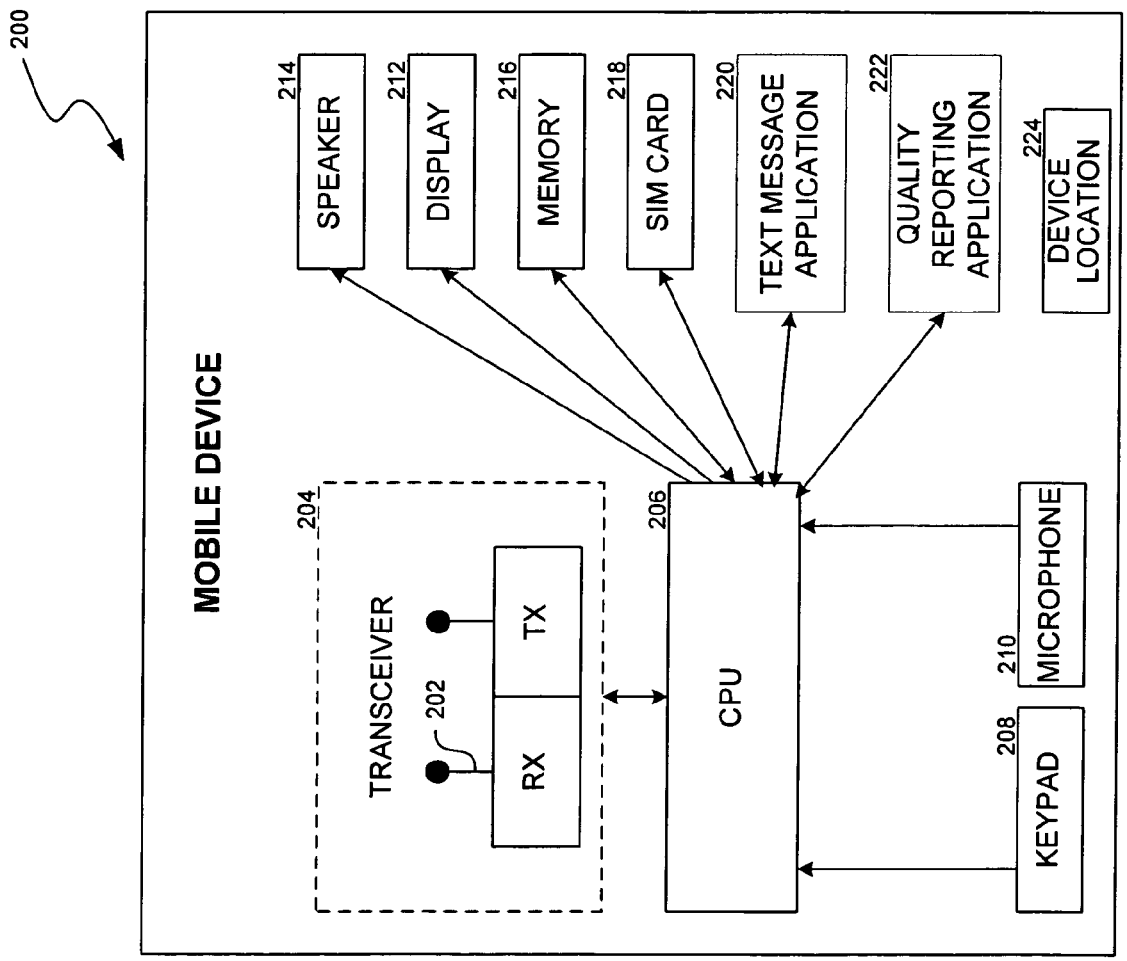
FIG. 2 is a block diagram showing the mobile communication device of FIG. 1 in one embodiment.
Figure 3:
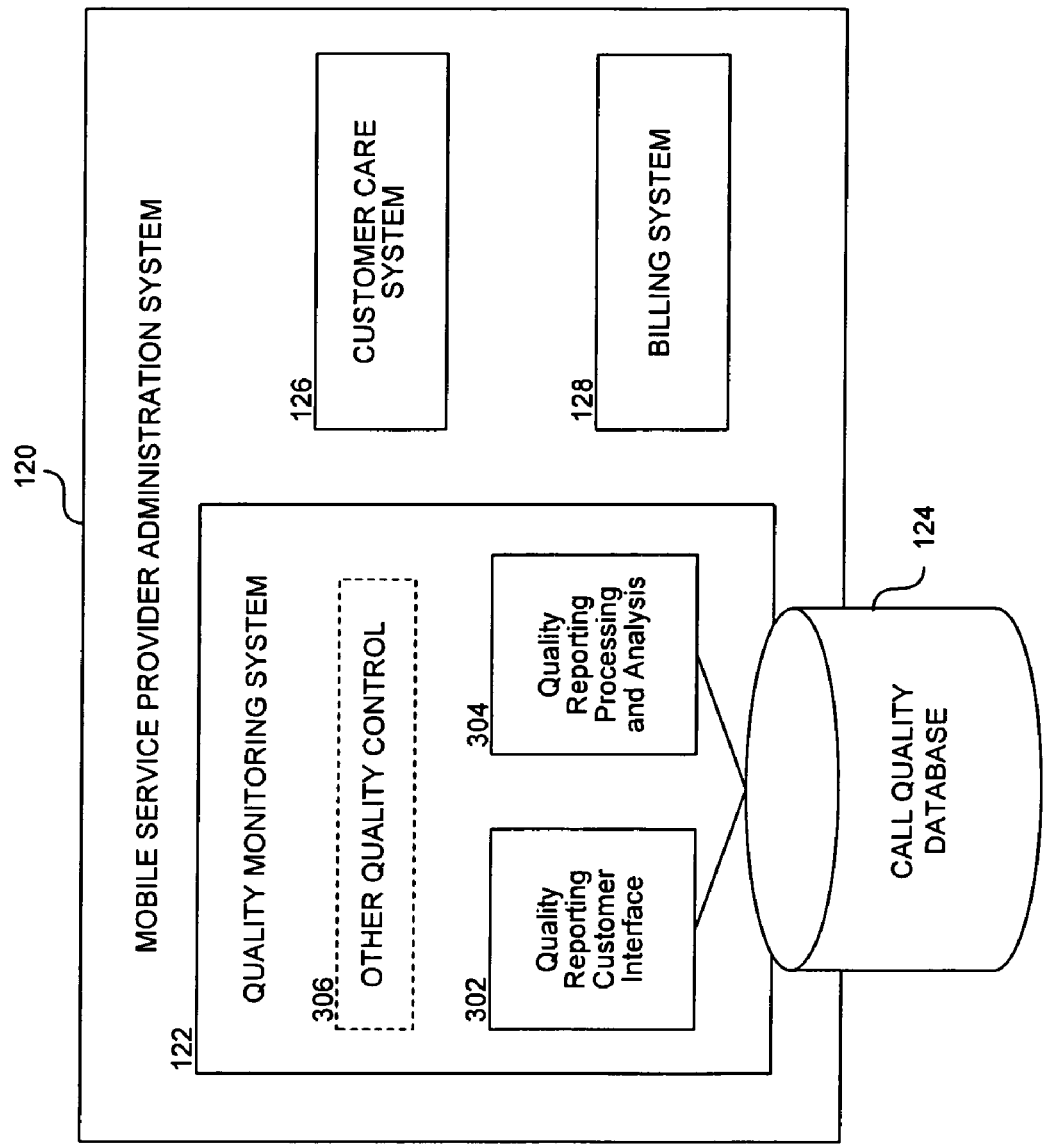
FIG. 3 is block diagram showing components of the mobile service provider administration system of FIG. 1 in one embodiment.

FIGS. 1-3 and the following discussion provide a brief, general description of a suitable computing/network environment in which the call quality monitoring can be implemented. Although not required, aspects of the call quality monitoring are described in the general context of computer-executable instructions, such as routines executed by a general-purpose computer, e.g., a server computer, wireless device, or personal computer. Those skilled in the relevant art will appreciate that the invention can be practiced with other communications, data processing or computer system configurations, including Internet appliances, hand-held devices (including PDAs), wearable computers, all manner of cellular or mobile phones, multi-processor systems, microprocessor-based or programmable consumer electronics, set-top boxes, network PCs, minicomputers, mainframe computers, and the like. Indeed, the terms "computer," "device," and "component" are generally used broadly and interchangeably, and refer to any of the above devices and systems, as well as any data processor.

Aspects of the call quality monitoring can be embodied in a special purpose computer or data processor that is specifically programmed, configured, or constructed to perform one or more of the computer-executable instructions explained in detail herein. Aspects of the call quality monitoring can also be practiced in distributed computing environments where tasks or modules are performed by remote processing devices, which are linked through a communications network, such as a LAN, WAN, or the Internet. In a distributed computing environment, program modules may be located in both local and remote memory storage devices (e.g., including memory associated with field programs, gate arrays, EPROM memory, etc.).

Aspects of the call quality monitoring may be stored or distributed on computer-readable media, including magnetically or optically readable computer discs, hard-wired or preprogrammed in chips (e.g., EEPROM semiconductor chips), nanotechnology memory, photonic memory, biological-based memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Referring to FIG. 1, a system 100 on which the quality of service assessment system may be implemented is shown. The system of FIG. 1 is an example of a GPRS (general packet radio service) system based on GSM (global system for mobile communication). However, the invention may be implemented on other types of systems, including a variety of cellular systems. The system 100 includes a mobile device 102 (e.g., mobile phone, PDA, wireless laptop, etc.) in communication with a base station 104. A base station controller 106 in communication with a serving GPRS support node (SGSN) 108 and a gateway GPRS support node (GGSN) 110 together support packet switched transactions, which are handled separately from circuit switched traffic that is supported by a mobile switching center (MSC) 111. The MSC 111 also serves as an access point for the Public Switched Telephone Network.

The SGSN 108, GGSN 110, and MSC 111 interact with a home location register 112 (HLR). In some embodiments, the HLR 112 is the primary database of permanent subscriber/customer information for the service provider's mobile network. In the context of activated devices, the HLR 112 may contain pertinent user information, including address information, account status, and preferences. In some embodiments, a visiting location register (VLR) 114 manages requests from out-of-area subscribers who are out of the area covered by their home system.

In the illustrated embodiment, the system 100 includes components associated with quality of service assessment including a mobile service provider administration system 120. The mobile service provider administration system 120 may include a quality monitoring system 122, a call quality database 124, a customer care system 126, and a billing system 128, described in more detail with respect to FIG. 3. Customers may interact with the mobile service provider administration system 120 and its various components via the mobile device 102 and a wireless services network 116, as well as through other means, such as the Internet 118.

FIG. 2 shows a block diagram of a typical mobile communication device 200, such as a mobile handset. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, EPROM, a hard disk, or other memory storage technologies. The removable memory 218 may consist of Subscriber Identity Module (SIM) cards, which are well known in GSM communication systems, or other well-known memory storage technologies, such as "smart cards." Various applications, including text message applications 220 and quality reporting applications 220, could be implemented in either the removable memory 218 or the nonremovable memory 216. For example, the applications may include a user interface application (e.g., a Java applet) that allows a user to rate a call or other transaction (e.g., by pushing a particular button). The applications may allow rating in real time (e.g., while a call is in progress) or, alternatively, after call has been completed. In some embodiments, an application used to rate a call or other communication may be located on a device that is separate from the device used to place the call itself (e.g., a smart device with GPS compatibility so that the precise location of the user can be identified if the phone itself does not have such capabilities).

In some embodiments, a device location component 224 allows the location of the device to be known to the wireless service provider, so that the wireless service provider can use this information (or pass it along) for the purpose of assessing call quality factors.

Referring to FIG. 3, a more detailed view of the mobile service provider administration system 120 of FIG. 1 is shown. The mobile service provider administration system 120 may include a call quality monitoring system 122 (also shown in FIG. 1). Various components of the quality monitoring system 122 may include a quality reporting customer interface 302 and a quality reporting processing and analysis component 304. Both of these components may communicate with a call quality database 124 (also shown in FIG. 1). For example, in some embodiments the quality reporting customer interface 302 may provide a way for customers to interact with the quality monitoring system 122 and provide information that can then be processed by the quality reporting processing and analysis component 304.

Both the data collected from the customer using the quality reporting customer interface 302 and the data resulting from processing by the quality reporting processing and analysis component 304 may be stored in the call quality database 124. In some embodiments the quality reporting customer interface 302 may be limited to a physical device interface (as opposed to possessing application-based user interface characteristics). For example, if the user's mobile device includes a comprehensive interface for providing quality reporting information, the quality reporting customer interface 302 may simply be an interface to retrieve information from the device. In contrast, if the user's mobile device does not include a comprehensive reporting interface, the quality reporting customer interface 302 may include various features that allow users to answer questions and/or provide statements about the quality of their calls. For example, in some embodiments, quality reporting customer interface 302 may include automated telephone questioning systems, a web server and related applications for providing online questionnaires, etc.

In some embodiments, the quality monitoring system 122 may also include other quality control components 306. For example these other quality control components may use objective standards for providing quality control information. Examples include PESQ systems, systems employing test mobile devices, etc. In some embodiments, the information collected by the other quality control components 306 may be compared with information obtained and retrieved by the quality reporting customer interface 302 and processed by the quality reporting processing and analysis component 304.

As described with respect to FIG. 1, the mobile service provider administration system 120 may also include a customer care system 126 and a billing system 128, which may optionally interact with the quality monitoring system 122 to address customer concerns such as dropped calls, credits to service plans, etc.

Unless described otherwise below, aspects of the invention may be practiced with conventional systems. Thus, the construction and operation of the various blocks shown in FIGS. 1-3 may be of conventional design, and need not be described in further detail herein to make and use the invention, because such blocks will be understood by those skilled in the relevant art. One skilled in the relevant art can readily make any modifications necessary to the blocks in FIGS. 1-3 (or other embodiments or Figures) based on the detailed description provided herein.

II. System Flows

Figure 4A:
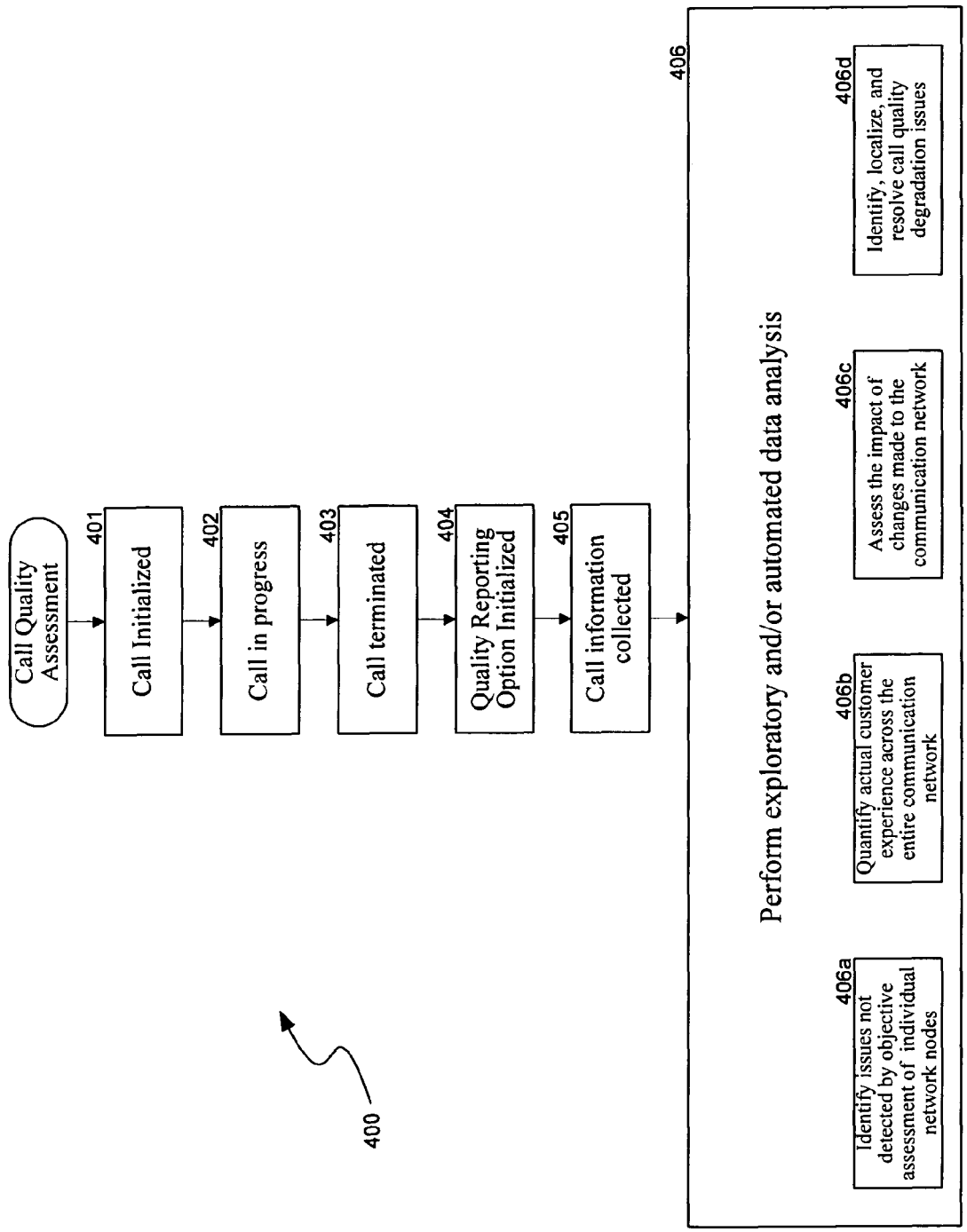
FIGS. 4A and 4B are flow diagrams showing examples of high level call quality assessment routines in some embodiments.

Referring to FIG. 4A, a high level call quality assessment routine 400 may provide a means for customers to report on call quality in accordance with some embodiments. At block 401 a call is initiated, which may include initiation at the network level and/or at the device level. At block 402 the call is in progress. At block 403 the call is terminated. For example, the user may have hung up the device to end the call, or the call may have been dropped due to inadequate service.

At block 404 a quality reporting option is initialized upon termination of the call. For example, the user may receive a message requesting input on the quality of the call or may be given the option to make a call to an automated quality monitoring reporting system. Many options for reporting are available without departing from the scope of the invention. At block 405 the quality monitoring system collects call information. At block 406 the quality monitoring system performs exploratory and/or automated data analysis. As a result of this data analysis, the quality monitoring system may identify issues not detected by objective assessment of individual network modes (block 406a); quantify actual customer experience across the entire communication network (block 406b); assess the impact of changes made to the communication network (block 406c); identify, localize, and resolve call quality degradation issues (block 406d), etc.

Figure 4B:
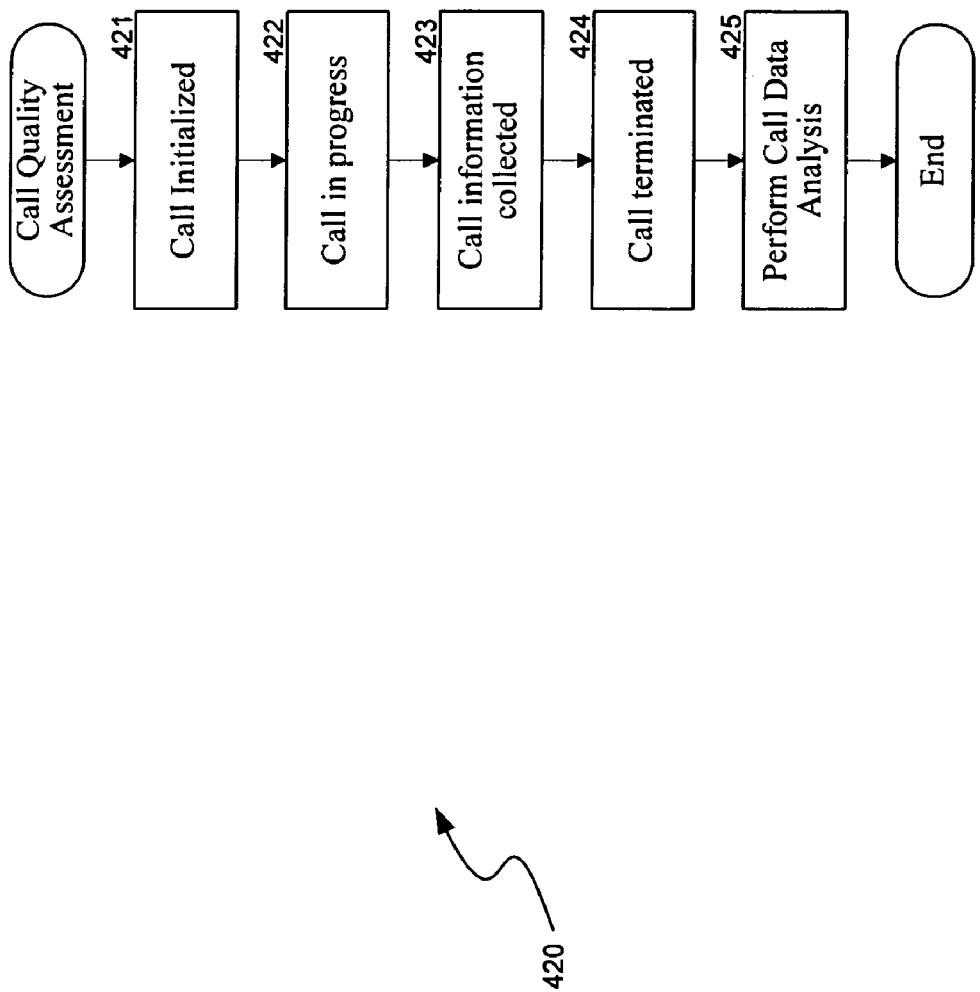

FIG. 4B shows a high level call quality assessment routine 420, similar to the routine 400 of FIG. 4A, but where the call quality information is collected from the user while the call is still in progress. For example at block 421a call is initiated, which may include initiation at the network level and/or at the device level. At block 422 the call is in progress. At block 423, the quality monitoring system collects call information during the call. For example, the user may be able to push a button on the phone each time he or she feels that call quality during the call is below an acceptable level. At block 424 the call is terminated. For example, the user may have hung up the device to end the call, or the call may have been dropped due to inadequate service. At block 425 the quality monitoring system performs exploratory and/or automated data analysis based on the information collected at block 423. Some of this analysis may also occur while the call is in progress. As a result of this data analysis, the quality monitoring system may identify issues not detected by objective assessment of individual network modes, quantify actual customer experience across the entire communication network, assess the impact of changes made to the communication network, identify, localize, and resolve call quality degradation issues, etc.

Figure 5:
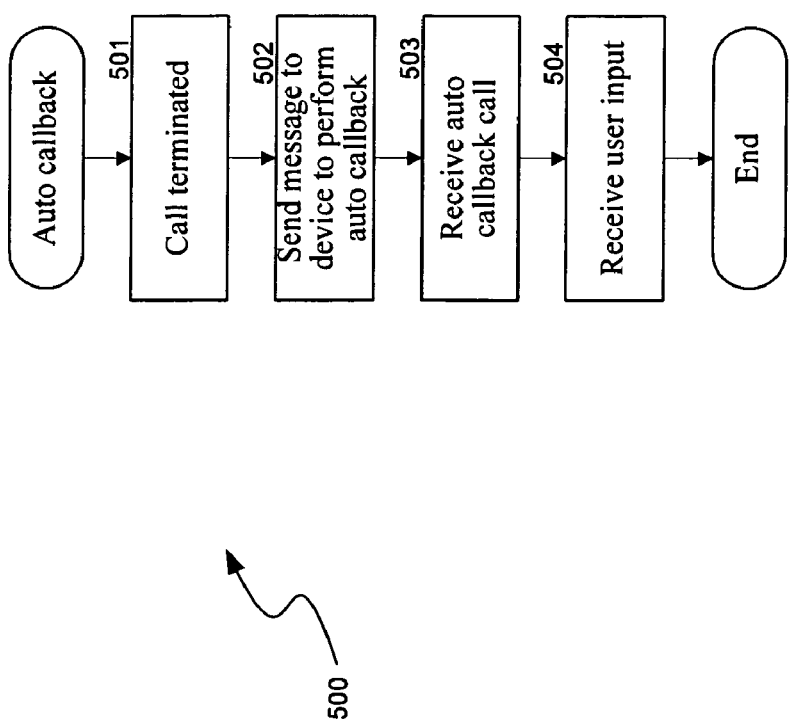
FIG. 5 is a flow diagram showing an example of an automatic callback routine for reporting on call quality in one embodiment.

FIG. 5 is a flow diagram showing an example of a routine 500 for collecting quality information is collected by an automatic callback feature. At block 501 the call is terminated. At block 502 the quality monitoring system sends a message to the device to perform auto callback upon completion of a call. Alternatively, the device may be programmed to automatically place such a call, depending on the conditions present at the device (e.g., termination of a call by the user, termination of a call due to loss of service or other network problem, etc.

At block 503 the quality monitoring system receives a callback from the mobile device. When this occurs, mobile device may ring as the call is being placed automatically by the mobile device. In some cases the user may have the option of hanging up or discontinuing the feedback call if the user does not want to provide input at this time. At block 504 the quality monitoring system receives user input via the automatic call. The routine 500 ends after block 504.

Figure 6:
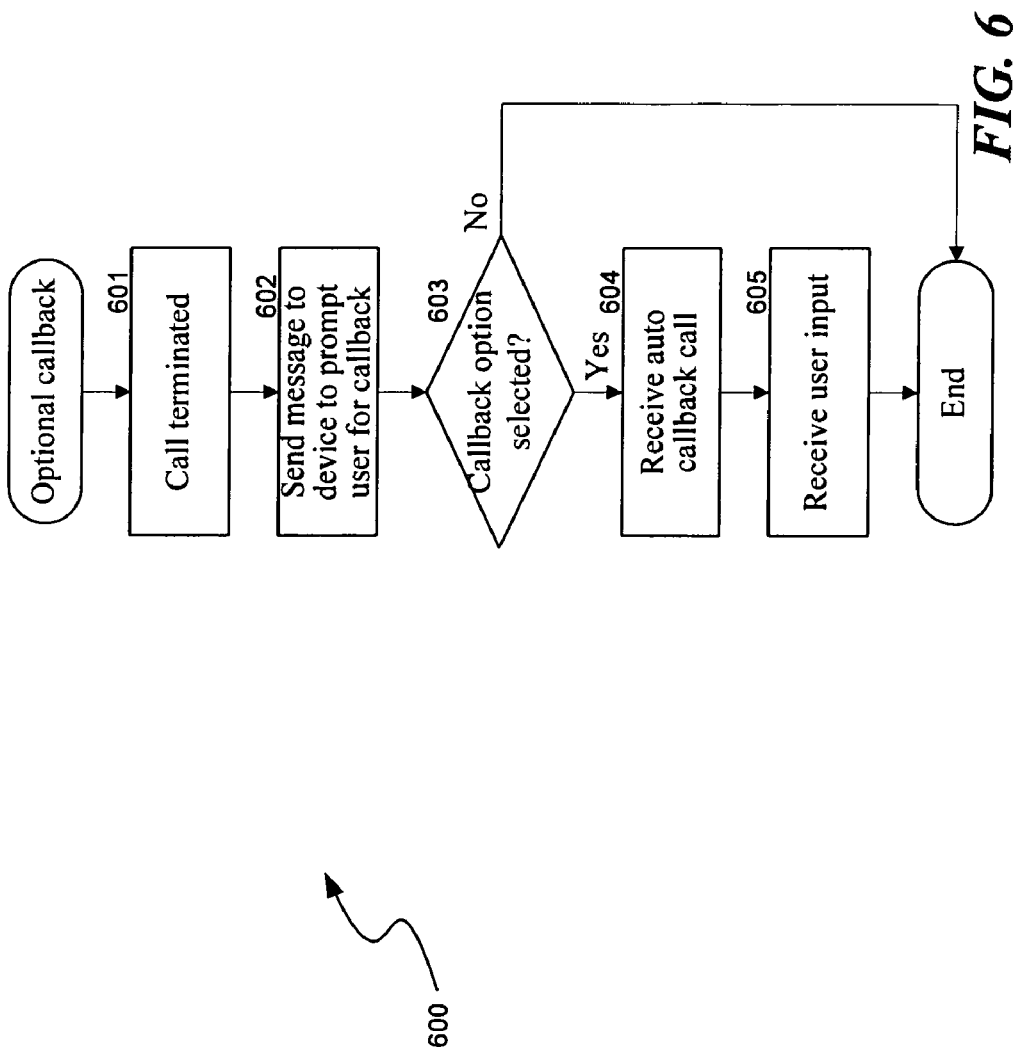
FIG. 6 is flow diagram showing an example of an optional callback routine for reporting on call quality in one embodiment.

FIG. 6 is a flow diagram showing an example of a callback option routine 600 for providing an opportunity for the user to optionally provide feedback on a call that was recently made. In this routine 600, the user has the option of whether or not to continue with a reporting call before the call is made. At block 601a call is terminated. At block 602 the quality monitoring system sends a message to the device to prompt the user for a callback (alternatively, the device may be programmed to display such a message without a prompt from the quality monitoring system. For example the user may receive a message displayed on his or her device screen requesting whether the he or she would like to call back and report on call quality at the current time.

At decision block 603, if the user selects to go forward with the callback option, the routine 600 continues at block 604. Otherwise the routine ends without reporting. At block 604 the routine receives an auto callback call from the device in response to the user's selection to provide feedback. At block 605 the quality monitoring system receives user input. After block 605 the routine ends.

Figure 7:
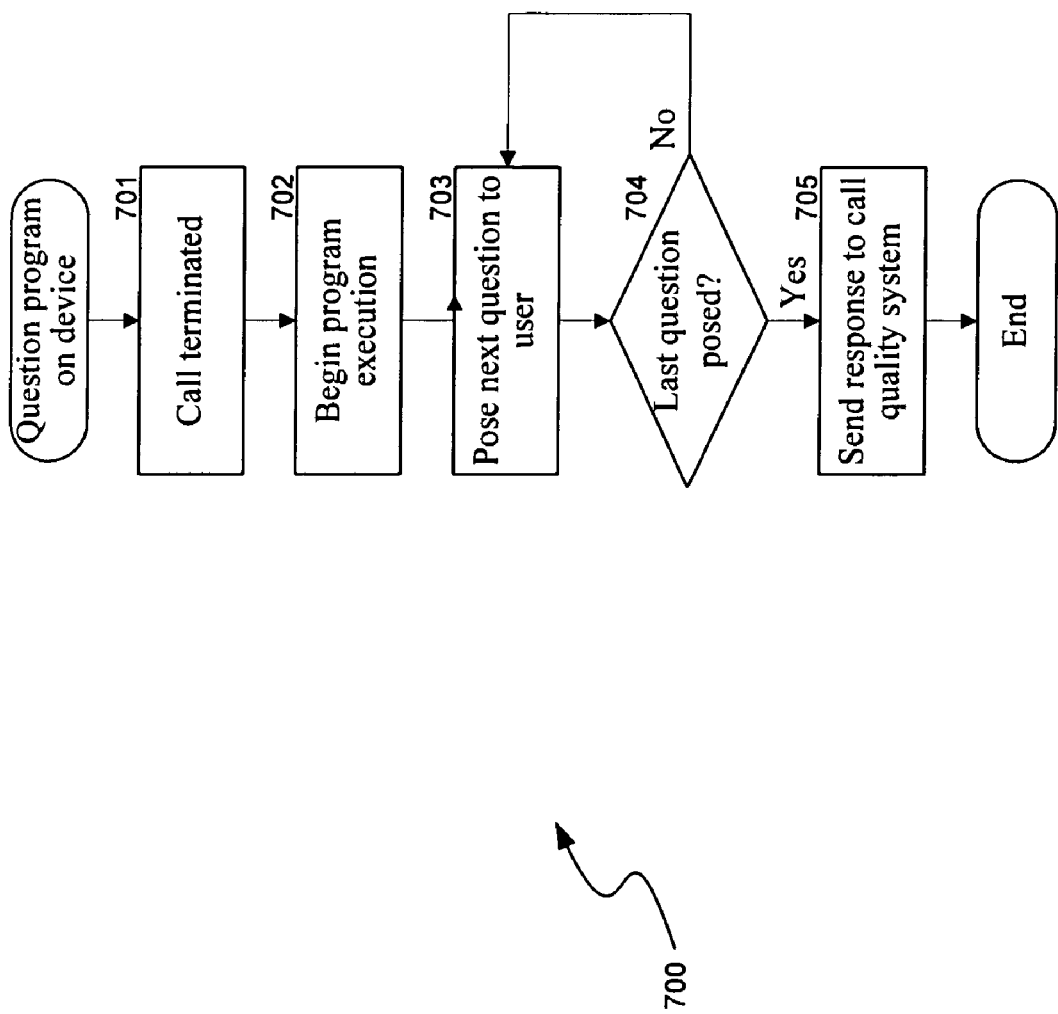
FIG. 7 is flow diagram showing an example of routine at the mobile device of FIGS. 1 and 2 for reporting on call quality using a questionnaire in one embodiment.

FIG. 7 is a flow diagram showing an example of a routine 700 for a post-call questionnaire, where the questionnaire is executed by a program on the mobile device itself. At block 701 the call is terminated. At block 702 the routine 700 begins executing at the mobile device. At block 703 the routine 700 poses a next question to the user. At decision block 704 if the routine 700 has posed a last question to the user, the routine 700 continues at block 705. Otherwise, the routine 700 loops back to block 703 to pose the next question to the user. At block 705, assuming all questions have been posed to the user, the routine 700 sends a response to the call quality monitoring system. For example, the routine 700 may provide data comprising a completed series of questions or statements by the user on call quality.

Figure 8:
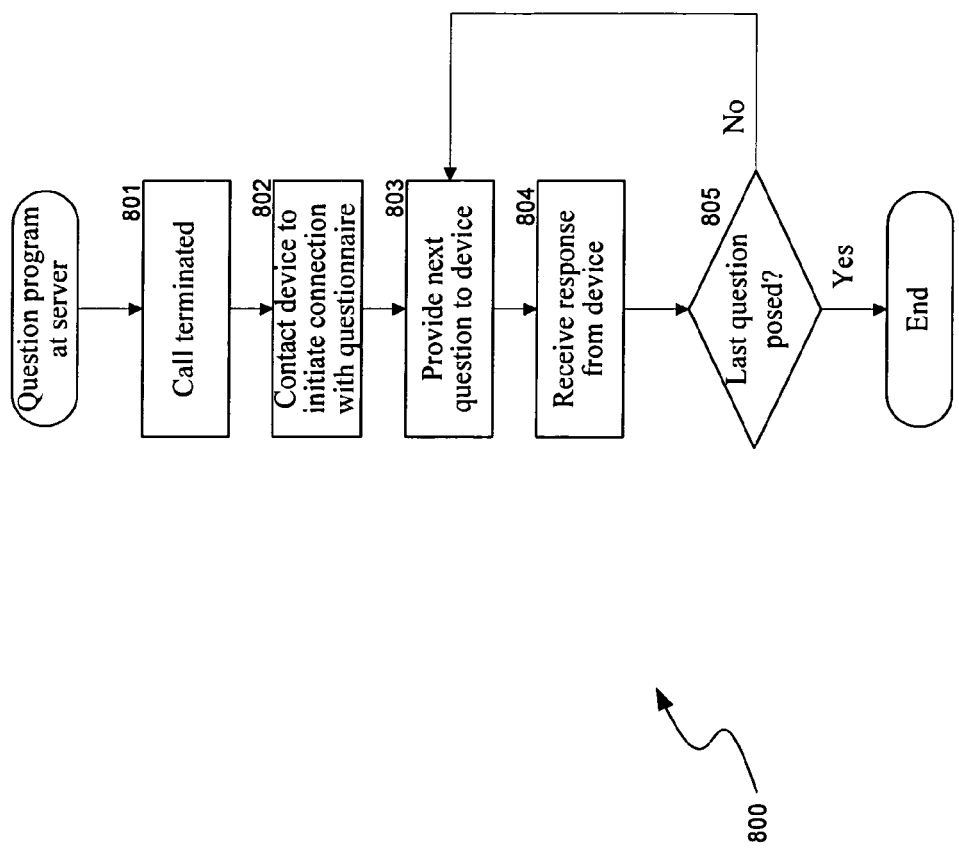
FIG. 8 is flow diagram showing an example of routine at the mobile service provider system of FIGS. 1 and 3 for reporting on call quality using a questionnaire in one embodiment.

FIG. 8 is a flow diagram showing an example of a routine 800 for presenting a post call questionnaire to the user of a mobile device, where the routine 800 is executed from the quality monitoring system. At block 801 the call is terminated. At block 802 the routine 800 contacts the device to initiate connection with the questionnaire application. At block 803 the routine 800 provides a next question to the device. At block 804 the routine 800 receives a response from the device (e.g., provided by the user as a response to a question in the questionnaire). At decision block 805, if the last question has been posed, the routine 800 ends. Otherwise, the routine 800 moves back to block 803 to provide the next question to the device.

III. User Interface for Collecting Call Quality Information

Figure 9:
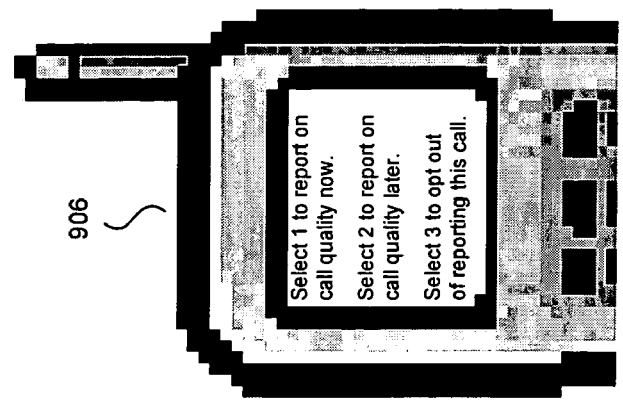
FIG. 9 is a display diagram showing an example of a user interface for acquiring call quality information from a user of a mobile device in one embodiment.
Figure 9:
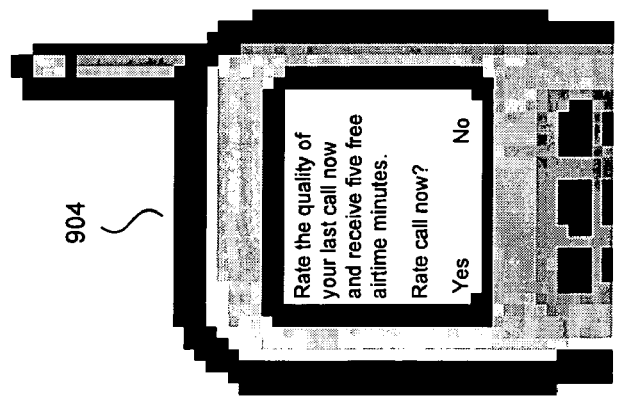
Figure 9:
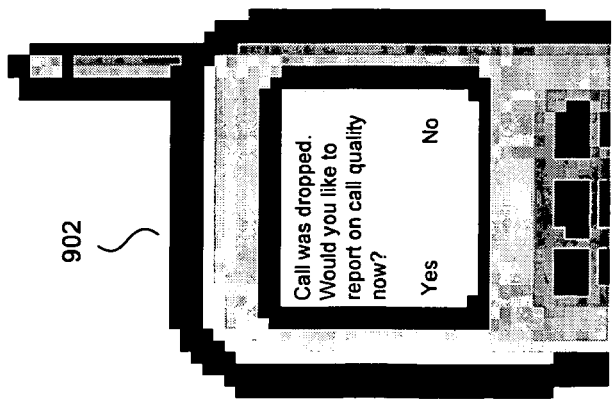

FIG. 9 is a display diagram showing various examples of providing a user of a mobile device with an'option to answer questions relating to call quality. With respect to display 902, a call has been dropped due to a service problem, and the user is asked: "Would you like to report on call quality now?" In this example, the user may select either "yes" or "no" using appropriate device keys.

In another example shown in display 904, a message provides: "Rate the quality of your last call now and receive free airtime minutes." The user may then respond "yes" or "no" as to whether he or she wishes to rate the call at the present time.

In a third example shown in display 906, a message provides three rating options: "Select 1 to report on call quality now"; "Select 2 to report on call quality later"; and "Select 3 to opt out of reporting call quality in relation to the current call." If the user selects the first option, the device may present a text questionnaire to the user or make a call to an automated quality reporting system, as described in more detail in the preceding flow diagrams and with respect to FIG. 10. Alternatively if the user selects to report on call quality later, the user may be given the option to provide feedback at a later time via any one of a number of means (e.g., Internet questionnaire, automated, call, text message on device screen, etc.).

Figure 10:
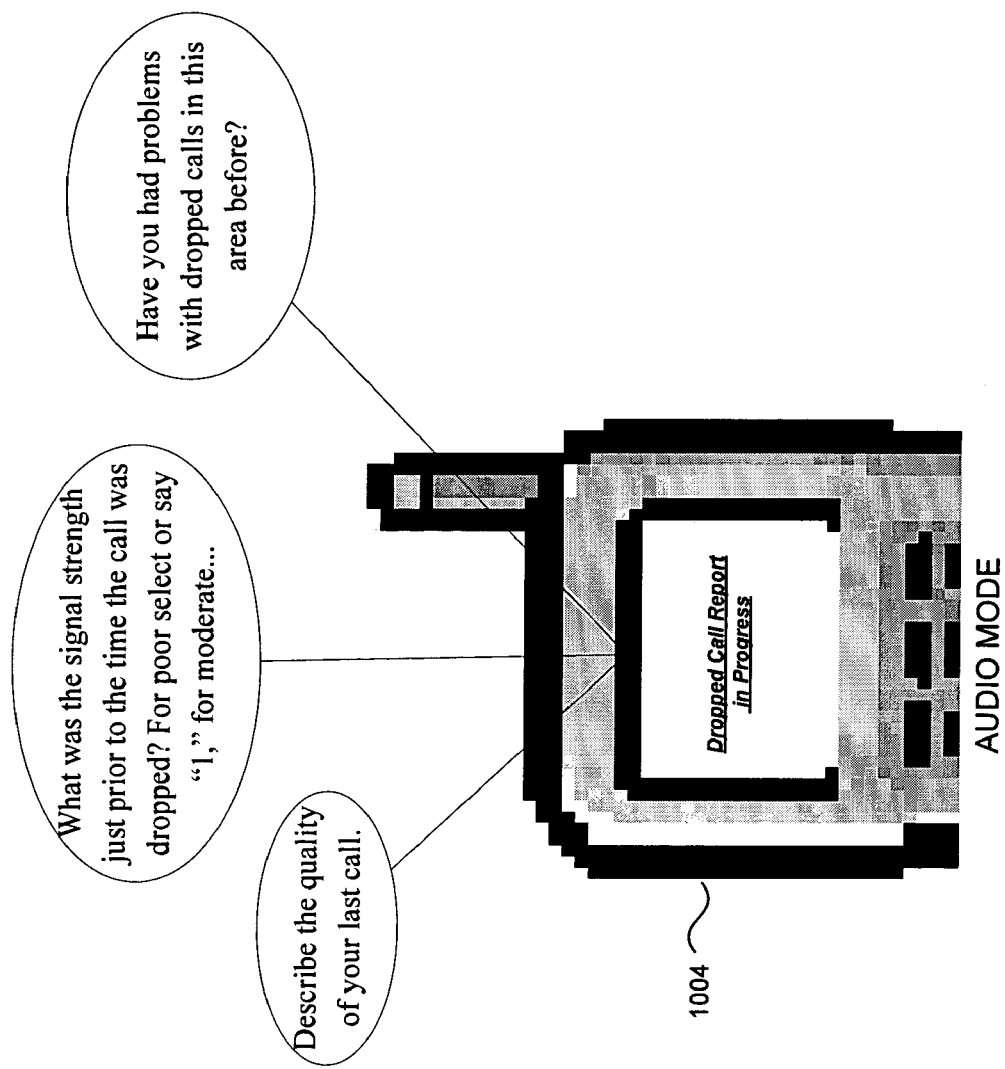
FIG. 10 is a display diagram showing a second example of a user interface for acquiring call quality information from a user of a mobile device in one embodiment.
Figure 10:
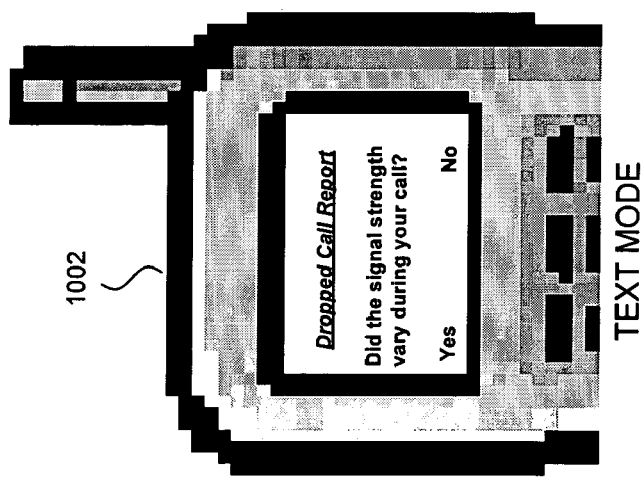

FIG. 10 is a display diagram showing an example of a user interface for reporting call quality. Display 1002 shows a text mode where the user is asked to report on call quality after a dropped call using text messaging or similar means. For example the user may be requested to answer the question: "Did the signal strength vary during your call?" To this the user may respond either "yes" or "no" using appropriate buttons on his or her device.

Display 1004 illustrates reporting on call quality using an audio mode (e.g., automated telephone system). For example, the user may be asked to "describe the quality of your last call." The user's response may then be recorded and or automatically processed. In another example, the user may be asked: "What was the signal strength just prior to the time that the call was dropped? For poor select or say 1, or moderate . . ." Another question that the user may be asked is "Have you had problems with dropped calls in this area before?"

While specific examples are given here for the purpose of illustration, regardless of the mode used (e.g., text mode 1002, in an audio mode 1004, or in another mode not illustrated here), any number of questions may be asked to the user for quality reporting. While by no means all inclusive, the table below shows examples of other types of questions that may be posed to users in determining call quality:

| Sound Quality |
| --- |
| On a scale of 1-5, with 5 being the best quality sound, how would you rate the quality of the sound of your call? Were you able to hear the person on the other end of the line clearly during the call? Never? Rarely? Most of the time? Always? Was the person on the other end of the line able to hear you during the call? Never? Rarely? Most of the time? Always? Do you have repeated problems with sound quality when placing calls in this area? |
| Noise |
| On a scale of 0-5 with 0 being no detectable background noise, how would your rate the amount of background noise of your call? How often were you able to hear unwanted background noise during your call? Never? Rarely? Most of the time? Always? What was the severity of background noise during your call? Greatly affected ability to hear content of call. Somewhat affected ability to hear content of call. Did not affect the ability to hear content of call but was annoying. Was audible but not distracting. No detectable background noise present Do you have repeated problems with sound quality when placing calls in this area? |
| Dropped Call |
| Did the signal strength vary during your call? What was the signal strength at the time the call was placed? What was the signal strength just prior to the time the call was dropped? Have you had problems with dropped calls in this area before? How many calls do you make in the area that the call was dropped? How many times did you attempt to reconnect the same call? |
| Subjective Reponses |
| Describe the quality of your last call. Describe your overall satisfaction with the quality of your last call. Describe how the quality of your last call could have been improved. Describe your overall experience with your wireless communication service provider. Describe your overall satisfaction wit your wireless communication service provider. |
| Other |
| Did you have dial tone problems when making this call? Press 1 for yes. Press 2 for no. Rate the call set up time for this call. Please indicate if there were issues disconnecting from this call. Please indicate if there were problems handing off between cells during this call. |

In addition to the above, other factors and techniques may be used in rating calls. For example, various different types of rating scales may be implemented. In another example, users may be provided with descriptive icons or graphics to select from to make call rating fast and easy.

IV. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments. Aspects of the invention can be modified, if necessary, to employ the systems, functions, and concepts of the various related technologies to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for assessing quality of a wireless communication experience, the method comprising:
   establishing a voice call between a wireless mobile device and a first device;
   detecting an activation of a button on the wireless mobile device while the voice call is in progress;
   responsive to detecting the activation of the button, executing a user interface application on the wireless mobile device;
   collecting, while the voice call between the wireless mobile device and the first device is in progress, call quality information via the user interface application;
   transmitting to a second device, while the voice call between the wireless mobile device and the first device is in progress, the call quality information collected via the user interface application, wherein analysis of the call quality information occurs at the second device while the call between the wireless mobile device and the first device is in progress; and
   presenting, by the user interface application, a first user-selectable option to provide additional call quality information immediately and a second user-selectable option to provide the additional call quality information at a later time.

2. The method of claim 1 further comprising transmitting location data for the wireless mobile device to the second device.

3. The method of claim 1 wherein transmitting to the second device the call quality information comprises transmitting the call quality information as text to the second device.

4. The method of claim 1 wherein the user interface application allows a user to rate the call in multiple call quality categories.

5. The method of claim 1 wherein providing the user interface application allows a user to rate the call in multiple call quality categories by entering information using a keypad of the wireless mobile device.

6. The method of claim 1 wherein transmitting to the second device the call quality information comprises transmitting the call quality information as codes to the second device.

7. The method of claim 1 wherein the user interface application provides an option to collect the call quality information each time call quality is below a level acceptable to the user.

8. The method of claim 1 wherein the user interface application allows a user to rate the call in multiple call quality categories; and wherein the multiple call quality categories include categories selected from a group consisting of sound quality, noise interference, call connection, call disconnection, call set up time, and call quality consistency.

9. A mobile communications device comprising:
   a transceiver configured to:
      establish a voice call with a first device, and
      transmit to a second device, while the voice call with the first device is in progress, call quality information collected from via a user interface application, wherein analysis of the call quality information occurs at the second device while the call is in progress; and
   a processor configured to:
      detect an activation of a button on the mobile communication device while the voice call with the first device is in progress,
      responsive to detecting the activation of the button, execute the user interface application,
      collect the call quality information via the user interface application while the voice call with the first device is in progress; and
      present, by the user interface application, a first user-selectable option to provide additional call quality information immediately and a second user-selectable option to provide the additional call quality information at a later time.

10. The mobile communications device of claim 9 wherein the processor is further configured to generate location data, and wherein the transceiver is further configured to transmit the location data to the second device while the voice call with the first device is in progress.

11. The mobile communications device of claim 9 wherein the transceiver is configured to transmit the call quality information as text to the second device.

12. The mobile communications device of claim 9 wherein the user interface application comprises an application running on the mobile communications device used for establishing or accepting the voice call.

13. The mobile communications device of claim 9 wherein the second device is a server computer associated with a wireless communication network.

14. The mobile communications device of claim 9 wherein the user interface application allows a user to rate the call in multiple call quality categories.

15. The mobile communications device of claim 9 wherein the user interface application allows a user to rate the call in multiple call quality categories by entering information using a keypad of the mobile communications device.

16. A mobile communications device comprising:
   a transceiver configured to:
      initiate data communications with a first device, and
      transmit to a second device, while the data communications with the first device are in progress, call quality information collected via a user interface application, wherein analysis of the call quality information occurs at the second device while the data communications with the first device are in progress; and
   a processor configured to:
      detect an activation of a button on the mobile communication device while the data communications with the first device are in progress,
      responsive to detecting the activation of the button, execute the user interface application,
      collect the call quality information from an user via the user interface application while the data communications with the first device are in progress, and
      present, by the user interface application, a first user-selectable option to provide additional call quality information immediately and a second user-selectable option to provide the additional call quality information at a later time.

17. The mobile communications device of claim 16 wherein the processor is further configured to generate location data, and wherein the transceiver is further configured to transmit the location data to the second device while the data communications with the first device are in progress.

18. The mobile communications device of claim 16 wherein the user interface application receives call quality information via a keypad configured on the mobile communications device.

19. The mobile communications device of claim 16 wherein the user interface application comprises an automated questioning system.

20. The mobile communications device of claim 16, wherein the user interface application collects objective call quality information and subjective call quality information.

21. The mobile communications device of claim 16, wherein the user interface application allows the user to rate the call in multiple call quality categories.

22. A non-transitory computer-readable medium containing instructions for performing a method comprising:
   establishing a voice call between a wireless mobile device and a first device;
   detecting an activation of a button on the wireless mobile device while the voice call is in progress;
   responsive to detecting the activation of the button, executing a user interface application on the wireless mobile device;
   collecting, while the voice call between the wireless mobile device and the first device is in progress, call quality information via the user interface application;
   transmitting to a second device, while the voice call between the wireless mobile device and the first device is in progress, the call quality information collected via the user interface application, wherein analysis of the call quality information occurs at the second device while the call between the wireless mobile device and the first device is in progress; and
   presenting, by the user interface application, a first user-selectable option to provide additional call quality information immediately and a second user-selectable option to provide the additional call quality information at a later time.

23. The non-transitory computer-readable medium of claim 22 wherein the user interface application allows a user to specify that at least one condition from a group of conditions occurred during the voice call, the group of conditions comprising: unintended disconnection of the call, unwanted noise during the call, an unusually long call connection time, poor sound quality during the call, and inability to establish the call.

24. The non-transitory computer-readable medium of claim 23 wherein the user interface application provides a mechanism for allowing the user to rate a voice call experience in at least one category using a numerical rating scale.

25. The non-transitory computer-readable medium of claim 23 wherein the user interface application provides a mechanism for allowing the user to report on a voice call experience in at least one category using a yes/no response.

26. The non-transitory computer-readable medium of claim 23 wherein the user interface application provides a mechanism for allowing the user to report on a voice call experience using user's own words.

* * * * *